United States Patent

Maier

[11] Patent Number: 5,992,609
[45] Date of Patent: Nov. 30, 1999

[54] APPARATUS FOR SORTING BY DIRECTING INDIVIDUAL PIECES

[75] Inventor: Wilhelm Maier, Wettingen, Switzerland

[73] Assignee: Grapha-Holding AG, Hergiswil, Switzerland

[21] Appl. No.: 09/141,939

[22] Filed: Aug. 27, 1998

[30] Foreign Application Priority Data

Sep. 15, 1997 [EP] European Pat. Off. .............. 97810653

[51] Int. Cl.⁶ .......................... B65G 47/10; B65G 37/00; B07C 9/00
[52] U.S. Cl. .............. 198/370.08; 198/358; 198/457.06; 198/464.2; 198/598; 209/651; 209/654; 209/917; 209/918
[58] Field of Search .............. 198/370.08, 598, 198/358, 457.06, 464.2, 483.1, 469.1; 209/651, 654, 917, 918

[56] References Cited

U.S. PATENT DOCUMENTS

| 2,814,378 | 11/1957 | Ekholm | 198/370.08 |
|---|---|---|---|
| 3,034,665 | 5/1962 | Speaker | 198/358 |
| 3,053,377 | 9/1962 | Strothmann | 198/358 |
| 3,096,871 | 7/1963 | Anderson | 198/464.2 |
| 3,776,344 | 12/1973 | Harrison | 198/469.1 |
| 4,084,684 | 4/1978 | Skinner, II | 198/464.2 |
| 4,253,573 | 3/1981 | Dubberly et al. | 209/651 |
| 4,256,216 | 3/1981 | Winters et al. | 198/598 |
| 4,441,604 | 4/1984 | Schlig et al. | 198/598 |
| 5,052,542 | 10/1991 | Wipf | 198/370.08 |

FOREIGN PATENT DOCUMENTS

| 0540464 | 5/1993 | European Pat. Off. . |
|---|---|---|
| 3916424 | 11/1990 | Germany . |
| 4309766 | 4/1996 | Germany . |

*Primary Examiner*—Donald P. Walsh
*Assistant Examiner*—Daniel Schlak
*Attorney, Agent, or Firm*—Friedrich Kueffner

[57] ABSTRACT

An apparatus for sorting individual pieces includes a plurality of conveying elements which are guided along a closed track and are coupled to each other to form an endless conveying chain. The conveying elements have an at least approximately horizontal support plane configured to place the individual items thereon. For feeding the conveying elements, they travel along the track past at least one feeding station and they travel past several target stations for emptying the conveying elements. Each target station is provided with a sweeping or deflecting device which travels alongside of the conveying elements and pushes the individual piece from the conveying elements.

15 Claims, 2 Drawing Sheets

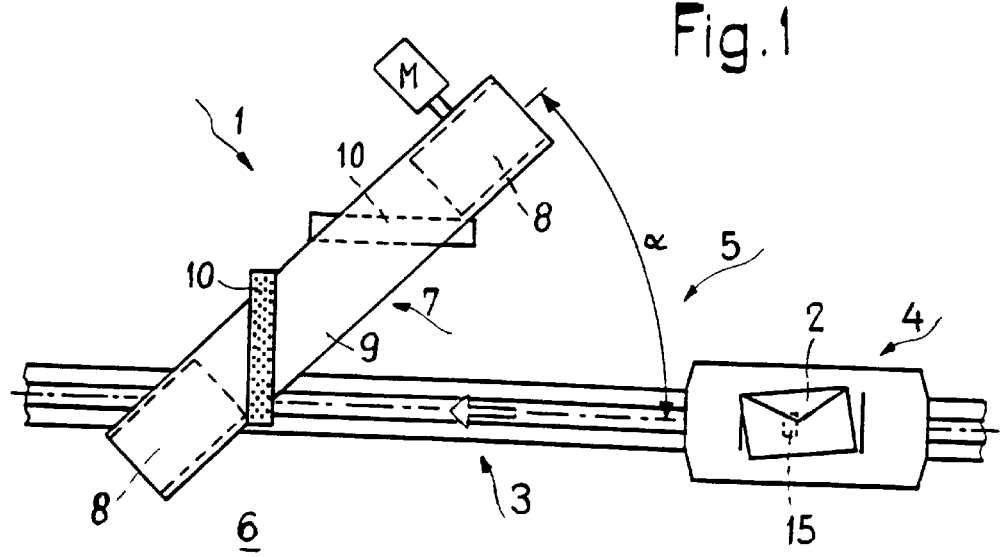
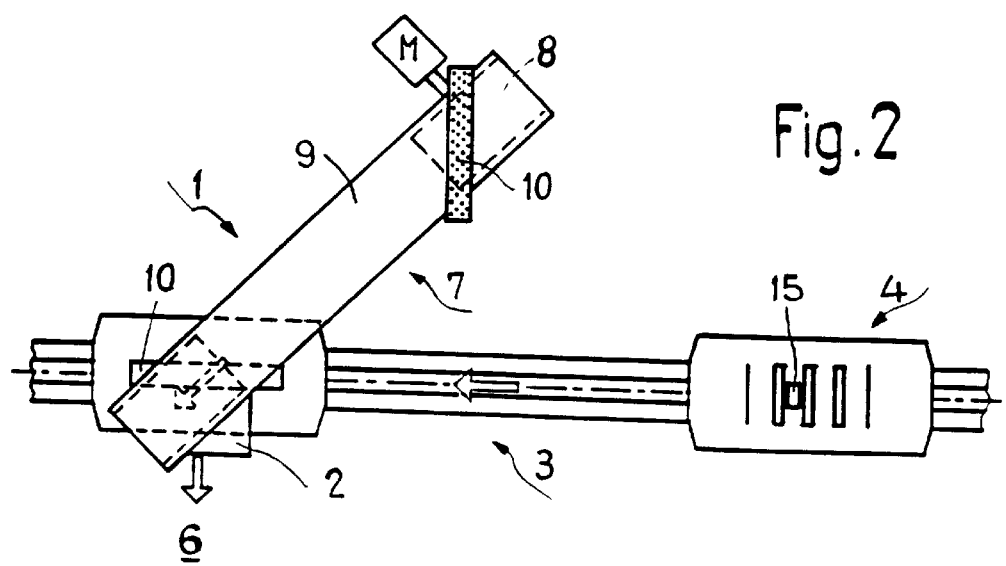
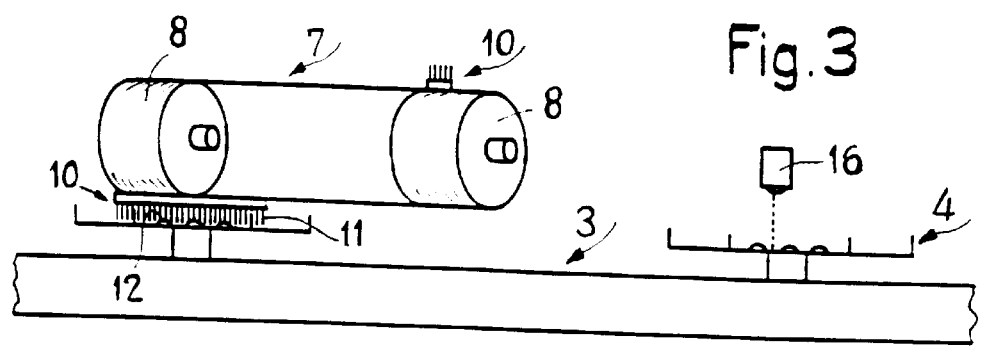

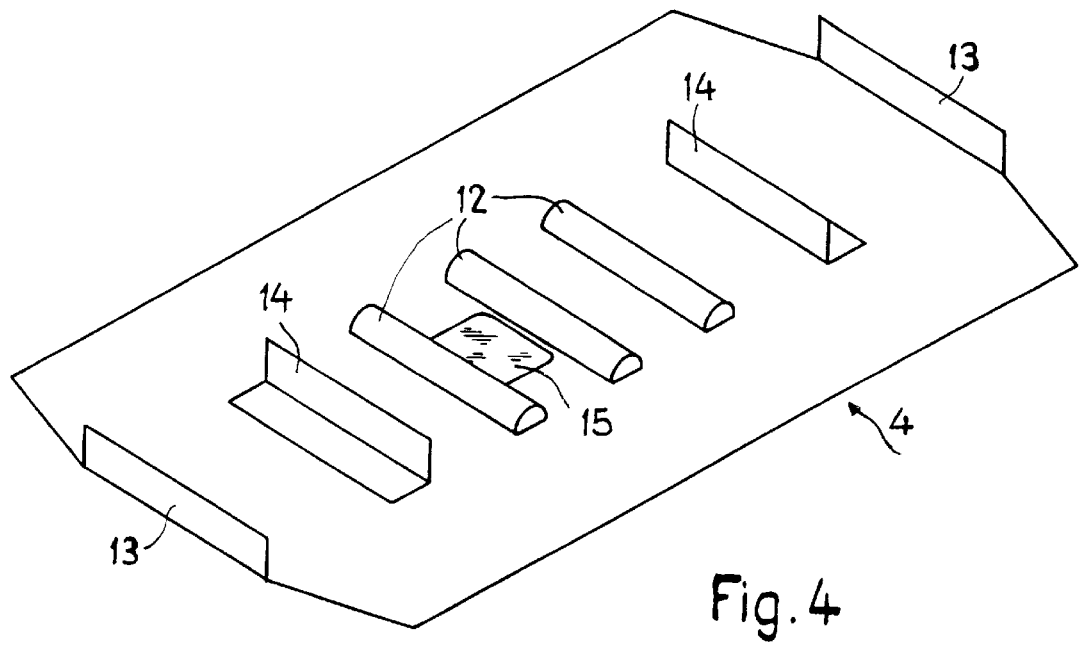
Fig. 4
Fig. 5
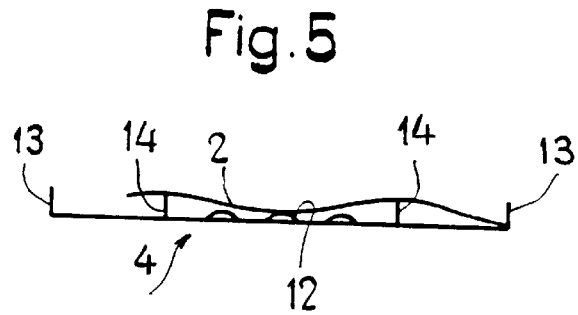
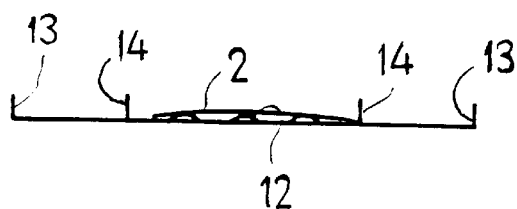
Fig. 6

APPARATUS FOR SORTING BY DIRECTING INDIVIDUAL PIECES

BACKGROUND OF THE INVENTION

1. Field of the Invention

The present invention relates to an apparatus for sorting individual pieces or piece goods. The apparatus includes a plurality of conveying means which are guided along a closed track and are coupled to each other to form an endless conveying means chain. The conveying means have an at least approximately horizontal support plane configured to place the individual items thereon. For feeding the conveying means, the conveying means travel along the track past at least one feeding station and the conveying means travel past several target stations for emptying the conveying means.

2. Description of the Related Art

EP-B1-0 540 464 describes and illustrates an apparatus for sorting individual pieces which include an endless carriage chain formed of several carriages coupled together one behind the other and guided along a closed track, wherein each of the carriages has a tray which can be swung to both sides about an axis extending in the direction of movement of the carriage. The tray can be swung from a horizontal position into a tilted position, wherein each carriage includes actuating members for swinging the trays. Provided at the track is at least one feeding station where the individual pieces are fed onto the trays and several target stations for removing the individual pieces from the trays.

Apparatus of this type are intended, inter alia, for sorting parcels by postal services. Because they have a wide field of applications, they are expensive and can only be used in large areas. The apparatus are not economical when processing flat items which have a relatively low weight, so that, because of the relatively high demand for the processing of flat individual pieces, it is desirable to have a simpler device.

SUMMARY OF THE INVENTION

Therefore, it is the primary object of the present invention to provide an apparatus which meets the requirements made of processing flat individual pieces, such as individual parts, shipment pouches, letters or workpieces and which is significantly less complicated than tilting tray sorters.

In accordance with the present invention, each target station is provided with a sweeping or deflecting device which travels alongside of the conveying means and pushes the individual piece from the conveying means.

The configuration according to the present invention makes possible a gentle treatment of the individual pieces when they are removed from the conveying means and a precise transfer of the individual pieces at the target stations.

In accordance with a preferred feature, the speed of the sweeping device accompanying the individual pieces along the track of the conveying means corresponds at least approximately to the speed of the conveying means.

Particularly advantageous has been found to be a sweeping device which has a pushing element fastened to a member revolving above the conveying means, wherein the pushing element interacts with the conveying means in a lower portion of the revolving member. This pushing element ensures a reliable removal of the individual items.

A suitable sweeping device is a traction means to which the pushing element is attached and which forms an acute angle with the rearward track portion of the conveying means. Preferred traction means are one or more revolving belts, chains or toothed belts.

In accordance with a useful feature, the pushing element is constructed in such a way that it forms in the pushing area a guide surface extending parallel to the direction of movement of the conveying means in order to stabilize the individual piece as it is being laterally displaced.

In order to be able to optimize the sweeping or displacement procedure, the angles between the traction means and the rearward track portion and between the traction means and the pushing element are adjustable.

To ensure that thin individual pieces are moved from the conveying means, the end portion of the pushing element facing the conveying means is constructed so as to be elastically deflectable, so that the lower edge of the pushing element may extend below the support plane for an individual piece.

An adaptable pushing element has found to be a brush having bristles extending perpendicularly of the support plane of the conveying means.

For optimizing the reliability of the sweeping device, it is useful if the conveying means, which are fastened to an endless link chain guided along the track and are constructed in the form of trays, have at the upper side thereof upwardly protruding support elements, for example, ledges extending transversely of the travel direction, wherein the support elements form a support plane for the individual items, so that even thin items can be contacted at the side edges thereof.

In order to ensure that the individual pieces are placed approximately on the same area on the conveying means in dependence on their size, stops are provided at the ends of the conveying means and/or at a distance from the ends. These stops hold the individual piece in an aligned position.

The sweeping device is activated when a conveying means is occupied. In order to recognize this condition, the conveying means has a light-reflecting surface within the support plane, wherein the light-reflecting surface is covered when an individual piece is placed on the conveying means and consequently cannot reflect the light ray produced at a light source and the operation of the sweeping device is started at the correct point in time.

Before the operation of the sweeping device is started, the pushing element of the sweeping device is in an initial position which is adjusted in dependence on the sweeping speed to the travel speed and the distance to be travelled by a certain conveying means from the detection location. These detection criteria are adjustable.

The movement of the sweeping device could also be controlled at the feeding location of the conveying means, as is the case in conventional tilting tray sorters.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic top view of the apparatus according to the present invention, shown in the initial position;

FIG. 2 is a schematic illustration of the apparatus shown in a position of operation;

FIG. 3 is a schematic side view of the apparatus shown in the position of FIG. 2;

FIG. 4 is a perspective view, on a larger scale, showing a conveying element;

FIG. 5 is a schematic side view of the conveying element of FIG. 4; and

FIG. 6 is another side view of the conveying element of FIG. 4, however, shown with a smaller individual piece placed thereon.

DESCRIPTION OF THE PREFERRED EMBODIMENTS

FIG. 1 of the drawing shows an apparatus 1 for sorting individual pieces 2, particularly flat pieces, such as shipment pouches, letters, workpieces, etc. The pieces 2 are conveyed along a track 3 by means of a conveying means chain 5 formed of tray-shaped conveying means or elements 4 to several target stations 6. When they reach the respective target station 6, the pieces are pushed laterally from the conveying element 4 by means of a sweeping device 7. For this purpose, the sweeping device 7 includes a belt 9 travelling around two spaced-apart rollers 8, wherein two pushing elements 10 are attached to the belt 9. The bottom portion of the revolving belt 9 causes the piece 2 to be deflected from the conveying element 4 by means of one of the pushing elements 10.

To make it possible that a piece 2 is deflected from a conveying element 4 over a predetermined period of time with moderate sweeping speed, the pushing element 10 accompanies the piece placed on a conveying element for travelling past the pushing element 10 and simultaneously pushes the piece 2 to the side where it is received, for example, by a conveyor unit, not shown.

These requirements can be met by arranging the sweeping device 7 obliquely relative to the track 3 as seen from the top. In other words, the lower portion of the belt 9 which carries out the sweeping action forms an acute angle α with the conveying portion of the conveying element 4 which preferably is straight and is at the rear in conveying direction. With increasing angle α, the distance over which the pushing element 10 accompanies the piece 2 along the track decreases and the required displacement speed of the pushing element 10 increases accordingly. When the angle α is smaller, the distance along which the pushing element 10 accompanies the piece 2 increases and a lower displacement speed is required for moving the pushing element 10 relative to the piece 2.

To ensure that the pushing element 10 can form a guiding edge at least in the operative area above a conveying element 4 and parallel to the track 3, the angle of the pushing element relative to the effective portion of the belt 9 has to be the same.

FIGS. 1 to 3 of the drawing show a sweeping device 7 which has two pushing elements 10 which are uniformly distributed along the belt 9. The pushing elements 10 are constructed as brushes. In FIG. 1, a pushing element 10, partially shown in broken lines, is at the lower portion of the belt 9 in the initial position, while the other pushing element 10 with upwardly directed bristles is at the upper portion of the endless belt 9 and will be moved during the next sweeping procedure into the initial position prior to sweeping.

Of course, the sweeping device 7 could also have a shorter length than illustrated, so that only one pushing element 10 is required. However, the resulting speed relationships could impair the reliability of operation of the sweeping device 7.

A change of the angle α would require an equal change of the angle of the pushing element 10 relative to the revolving belt 9 of the sweeping device 7. The adjustment of the pushing element 10 could be effected, for example, by holes provided at both edges of the belt 9 and a slot extending approximately over the length of the pushing element 10 for inserting fastening screws through the slot, wherein the belt 9 advantageously would have to protrude laterally beyond the rollers 8.

As illustrated in FIG. 2, the pushing element 10 is in the pushing position and is about to push the accompanying piece 2 laterally from the conveying element 4. The displacement of the piece 2 takes place in approximately a perpendicular direction relative to the respective conveying element 4.

FIG. 3 is a side view of the position of FIG. 2 and shows the effective length and height of the pushing element 10 constructed as a brush. The ends of the bristles 11 extend under the support plane for flat individual pieces formed by the support elements 12. The ledge-like support elements 12, better illustrated in FIG. 4, are connected to the tray-shaped conveying element 4 in order to space a piece 2 away from the tray of the conveying element 4 and to provide an edge of the piece 2 on which the pushing element 10 can act. Stops 13 and 14 are provided at the ends of the conveying element 4 as well as at a distance from the support elements 12, wherein the piece 2 can rest against the stops 13 and 14. The inner stops 14 are intended for shorter pieces 2.

FIGS. 5 and 6 show the conveying element 4 with pieces 2 placed thereon. FIGS. 5 and 6 also make it clear that the conveying element 4 can be moved in the opposite direction, wherein the sweeping device 7 is constructed for this type of operation.

FIGS. 1 to 4 further show a reflecting layer 15 for a light ray of a light source 16. The reflecting layer 15 is arranged in the area of the support plane of the conveying element 4.

The light ray serves to inform a control unit, not shown, as to whether a piece 2 is placed on the conveying element 4. If the conveying element 4 is occupied, the non-reflected light ray triggers a sweeping movement of the sweeping device 7. If the conveying element 4 is not occupied when passing the light ray, the light ray reflected at the conveying element 4 informs the control that the sweeping device 7 is to remain inoperative when the conveying element 4 travels past the sweeping device 7.

The invention is not limited by the embodiments described above which are presented as examples only but can be modified in various ways within the scope of protection defined by the appended patent claims.

I claim:

1. An apparatus for sorting by diverting individual pieces, the apparatus comprising a plurality of conveying means guided along a closed track and coupled to one another to form an endless conveying means chain, wherein each conveying means has an at least approximately horizontally extending support plane for placing individual pieces thereon, further comprising at least one feeding station for feeding individual pieces to the conveying means and at least one target station for emptying the individual pieces from the conveying means, wherein the track extends alongside the at least one feeding station and the at least one target station, wherein the at least one target station comprises a sweeping device for pushing the individual pieces from the conveying means while travelling alongside with the conveying means.

2. The apparatus according to claim 1, wherein a speed of the sweeping device travelling alongside the individual pieces along the track of the conveying means corresponds at least approximately to a speed of the conveying means.

3. The apparatus according to claim 1, wherein the sweeping device comprises at least one revolving member mounted above the conveying means, and a pushing element mounted on the revolving member so as to interact with the conveying means when the pushing element is in a lower portion of the revolving member.

4. The apparatus according to claim 3, wherein the revolving member is comprised of a traction means travelling about two parallel axes, wherein the traction means extends at an acute angle relative to a rearward track portion of the conveying means.

5. The apparatus according to claim 3, wherein the pushing element forms a guide surface extending parallel to a travel direction of the conveying means when the pushing element is in a pushing range.

6. The apparatus according to claim 4, wherein the traction means and the rearward track portion and the pushing element are configured such that angles between the traction means and the rearward track portion and between the traction means and the pushing element are adjustable.

7. The apparatus according to claim 3, wherein the pushing element has an end portion facing the conveying means, wherein the end portion is configured so as to be elastically deflectable.

8. The apparatus according to claim 7, wherein the pushing element is comprised of a brush having bristles directed approximately perpendicularly to the support plane of the conveying means.

9. The apparatus according to claim 7, wherein the pushing element extends below the support plane of the conveying means.

10. The apparatus according to claim 1, wherein each conveying means comprises a tray and is fastened to an endless link chain guided on the track, wherein the tray has at an upper side thereof upwardly directed support elements forming the support plane for the individual pieces.

11. The apparatus according to claim 10, wherein the tray of the conveying means has at least at ends thereof in a travel direction a stop each for the individual pieces.

12. The apparatus according to claim 10, wherein the tray of each conveying means has within the support plane a reflecting surface for a light ray for determining whether an individual piece is placed on the support plane.

13. The apparatus according to claim 10, wherein the tray of each conveying means has within the support plane a passage opening for a light ray for determining whether an individual piece is placed on the support plane.

14. The apparatus according to claim 12, further comprising a control means connected to the light ray for actuating the sweeping device.

15. The apparatus according to claim 13, further comprising a control means connected to the light ray for actuating the sweeping device.

* * * * *